United States Patent Office 3,325,524
Patented June 13, 1967

3,325,524
ALUMINUM COMPOUNDS AND METHOD OF PREPARATION
Allan J. Lundeen, Ponca City, Okla., assignor to Continental Oil Company, Ponca City, Okla., a corporation of Delaware
No Drawing. Filed July 27, 1961, Ser. No. 127,099
8 Claims. (Cl. 260—448)

This invention relates to novel aluminum compounds, and also it relates to a novel method of preparing aluminum compounds.

In conducting research work on the reaction between a dialkylaluminum hydride and an alpha-olefin, it was found that the type of reaction products obtained could not be predicted on the basis of the reactability of the lower molecular weight alpha-olefins. For example, the reaction between allene and dialkylaluminum hydride yields the dialumino compound with appreciable amounts of the mono-substituted aluminum compound. On the other hand, the conjugated diolefins such as butadiene do not permit any significant addition of the aluminum compound to each of the double bonds in the molecule. Surprisingly, alpha-omega diolefins, e.g., pentadiene-1,4 will react with the dialkylaluminum hydride, although the product distribution is significantly less favorable than what can be obtained by the improvements which will be discussed hereinbelow. Another unexpected development is that the next higher alpha-omega diolefin, namely, 1,5-hexadiene, will not react with the hydride to form the dialumino compound unless a suitable complexing agent of the type to be discussed later is employed. However, the alpha-omega diolefins containing more carbon atoms than hexadiene will react with the hydride to form the dialumino compounds without the use of a complexing agent. From the foregoing facts, it is apparent that the lower molecular weight diolefins are not a reliable guide to determine the way in which the higher diolefin, namely, those containing five and at least seven carbon atoms will react.

We have also discovered that the reaction between an alpha mono-olefin or an alpha-omega diolefin containing at least 5 carbon atoms can be reacted with the dialkylaluminum hydride in producing higher yields of aluminum compounds through the use of a suitable complexing agent which is described later in greater detail. The complexing agent also makes possible obtaining difunctional aluminum compounds from alpha-omega 1,5-hexadiene but not from conjugated diolefins in any significant quantity. Unfortunately, the production of difunctional aluminum compounds from alpha-omega 1,5-hexadiene does not shed light on the reason why the conjugated diolefins do not react in any significant manner with the hydride. In all cases where it is possible to produce difunctional aluminum compounds from diolefins, the complexing agent improves product distribution significantly and thus offers a commercially feasible method for production of these compounds. The complexing agent, by suppressing side reactions, also produces improved yields when the mono-olefin is employed.

Accordingly, an object of this invention is to provide novel dialuminum compounds prepared from a dialiphatic aluminum hydride and an alpha-omega diolefin containing at least five carbon atoms.

Another object of this invention is to provide a novel method reacting a dialiphatic aluminum hydride and an alpha-olefin to produce aluminum substituted organic compounds.

Still another object of this invention is to provide a novel method of reacting alpha-omega diolefins containing at least 5 carbon atoms with a dialiphatic aluminum hydride to provide high yields of alumino compounds.

Other objects and advantages of this invention will become apparent from the following description and explanation thereof.

The present invention is concerned with novel compounds having the following structural formula, which are designated as alkyl or cycloalkyl substituted dialumino alkanes:

(1)
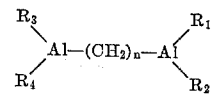

wherein $n$ is an integer of at least five and may be as high as 20 carbon atoms or higher, and $R_1$, $R_2$, $R_3$ and $R_4$ are the same or different radicals selected from the group consisting of alkyl and cycloalkyl groups. These compounds find use in the preparation of chemical intermediates, also in the preparation of difunctional compounds having the general formula $X-(CH_2)_n-X$. For example, the dialumino compounds can be oxidized to form diols, carbonated to form diacids, halogenated to form dihalides, etc. Dichloride compounds can be prepared by reacting chlorine gas with the dialumino compound, usually in stoichiometric quantities, at substantially room temperature. The aluminum chloride byproduct can be complexed with a material, such as pyridine, and separated from the dihalide product.

In another aspect of the invention, the following aluminum compounds are provided which have the indicated structural formula and may be classified as alkyl or cycloalkyl substituted mono-alumino alkenes:

(2)
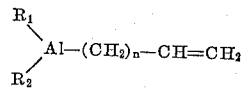

where $n$ is an integer of at least three and may be as high as 20 carbon atoms or higher, and $R_1$ and $R_2$ are radicals selected from the same or different groups consisting of alkyl and cycloalkyl groups. These compounds find use as chemical intermediates and also in the preparation of compounds which can be employed as monomers in polymerization reactions.

In still another aspect of the invention, the dialkyl or dicycloalkylaluminum hydride is reacted with an alpha-omega diolefin containing at least five carbon atoms and up to 20 carbon atoms or higher in the presence of a complexing agent. This reaction which can be utilized to effect either mono-substitution of the hydride or formation of the difunctional aluminum compound is illustrated by the following reactions:

(3)
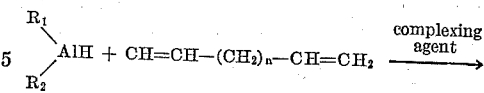

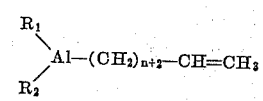

(4)
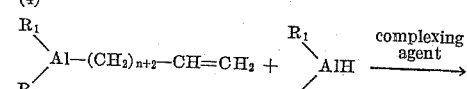

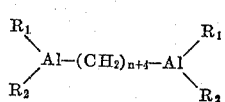

In a further aspect of the invention, the dialkyl or dicycloalkylaluminum hydride is reacted with an alpha-mono-olefin containing at least three carbon atoms and as high as 20 carbon atoms or higher, in the presence of the complexing agent according to the following reaction:

(5)
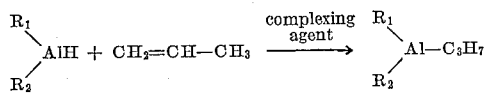

In still a further aspect of the invention, the dialkyl or dicycloalkylaluminum hydride is reacted with an alpha-omega diolefin containing five carbon atoms or one which contains at least seven carbon atoms in the absence of a complexing agent to produce a difunctional aluminum compound, according to the following reaction:

(6)
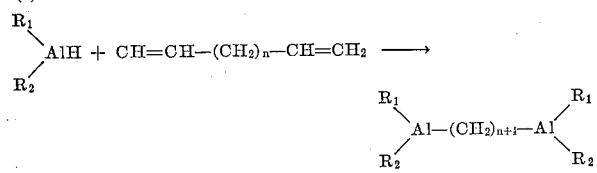

The hydride which is to be used as one of the reactants in the method of this invention is either a dialkyl- or dicyclo-alkylaluminum hydride. The alkyl substituents in the hydride can be the same or different and contain from about one to twenty carbon atoms or higher. The cycloalkyl substituents can be cyclopentyl, cyclohexyl or alkyl substituted cyclopentyl or cyclohexyl radicals. The alkyl substituent on the cycloalkyl group contains from about one to four carbon atoms or higher. Specific examples of hydrides are dimethylaluminum hydride, diethylaluminum hydride, dipropylaluminum hydride, dibutylaluminum hydride, dicyclohexylaluminum hydride, dicyclopentylaluminum hydride, and the like.

The hydride is reacted with an olefin of the types mentioned hereinabove, that is, either a mono-olefin in which a double bond is present at the alpha position of the molecule, or an alpha-omega diolefin. The alpha monoolefins contain from two carbon atoms up to about twenty or more carbon atoms to the molecule. When the reaction is conducted in the presence of the complexing agent of the present invention, the diolefin contains from about five to twenty carbon atoms or higher to the molecule and preferably about five to twelve carbon atoms. The reaction with the hydride can take place in the absence of the complexing agent; and in that case, the diolefin contains five carbon atoms or about seven to twenty carbon atoms or more. More usually the latter reaction involves a diolefin containing about seven to twelve carbon atoms. Specific examples of the alphaolefins are 1-propene, 1-butene, 1-pentene, 1-hexene, 1-heptene, 1-octene, allene, 1,4-pentadiene, 1,5-hexadiene, 1,6-heptadiene, 1,7-octadiene, etc.

The reaction between the hydride and alpha-olefin can be carried out in the presence of a complexing agent. The complexing agent improves the yield of desired alumino compound, reduces side reactions and shortens substantially the period of reaction required for a particular yield of product. The complexing agent can be any organic compound which is capable of complexing with an aluminum trialkyl such as aluminum triethyl and provides a heat of complexing of between about two and twenty kilocalories per gram mole (based on complexing with aluminum triethyl), preferably between about five and fourteen kilocalories per gram mole. The complexing agents do not react with the hydride and are not sufficiently strong to prevent addition of the olefin to the hydride. The complexing agent includes the amines such as dimethyl aniline, the heterocyclic nitrogen compounds such as pyridine, the ethers including the aromatic, aliphatic and cyclic ethers. The ethers represent an unusually effective class of complexing agents, and among them the paraffin or aliphatic ethers are the most effective. In that respect, the complexing action of the ethers falls off as the aromatic groups increase. Specific examples of the ethers are dimethyl ether, diethyl ether, dipropyl ether, dibutyl ether, dioctyl ether, dicyclohexyl ether, anisole, methyl phenyl ether, diphenyl ether, tetrahydrofuran, 1,4-dioxane, etc. The quantity of complexing agent employed in the reaction is stoichiometric or greater based on the hydride, usually from stoichiometric to about 20 moles per mole. The quantity of complexing agent is selected on the basis of preventing undesirable reactions, e.g., with alpha-omega hexadiene to prevent cyclization to methyl cyclopentane.

The reaction between the hydride and the alpha-olefin is conducted at temperatures between about 30° and 200° C. and preferably between about 50° and 100° C. The reaction pressure may be at subatmospheric, atmospheric or superatmospheric levels; however, usually the reaction is effected under the vapor pressure of the reactants at the temperature level mentioned above. Under the conditions of temperature and pressure mentioned above, it usually takes about five minutes to twenty hours, or more usually about fifteen minutes to five hours for the reaction to occur to the extent desired. In any case, it should be understood that the reaction may occur at times, temperatures and pressures outside the ranges given, although the results may not be as satisfactory.

Under the reaction conditions of time, temperature and pressure which are described above, the hydride can be reacted with the alpha mono-olefin to produce a mono-substituted aluminum compound. For such a reaction, stoichiometrical proportions of the reactants can be used; however an excess of one of the reactants is also contemplated, such as, for example, an excess of the mono-alpha olefin.

Illustrative examples of reactions which can be carried out to provide the mono-substituted aluminum compound include the reaction of diethylaluminum hydride and ethylene, diisopropyl-aluminum hydride and 1-butene, diisobutylaluminum hydride and 1-eicosene, diamylaluminum hydride and 1-octene, dinonylaluminum hydride and 1-pentene, ditetradecylaluminum hydride and propylene, dihexylaluminum hydride and 1-decene, dieicosylaluminum hydride and 1-dodecene, dicyclohexylaluminum hydride and 1-tetradecene, dimethylcyclohexylaluminum hydride and 1-pentadecene, and the like.

The hydride can also be reacted with the alpha-omega diolefin to produce a mono-substituted compound. Here again stoichiometric proportions of the reactants can be employed, but preferably an excess of the diolefin is used. Specific examples of this process include the reaction of dipropylaluminum hydride with 1,4-pentadiene, diethylaluminum hydride with 1,17-octadecadiene, diisobutylaluminum hydride with 1,8-nonadiene, dipentadecylaluminum hydride with 1,6-heptadiene, didodecylaluminum hydride with 1,13-tetradecadiene, didecylaluminum hydride with 1,5-hexadiene, dioctylaluminum hydride with 1,11-dodecadiene, diheptylaluminum hydride with 1,7-octadiene, diisoamylaluminum hydride with 1,15-hexadecadiene, dihexylaluminum hydride with 1,9-decadiene, dicyclopentylaluminum hydride with 1,5-hexadiene, and the like.

In the case of preparing a difunctional compound, the reaction can be conducted in two steps, using the reaction conditions referred to above. In the first step, the stoichiometric proportions of reactants are used, or an excess of diolefin in an amount of about 0.5 to 20 percent excess over the stoichiometric amount can be employed to provide the mono-substituted aluminum compound. The excess diolefin tends to reduce the tendency for side reactions to occur. For the second step, the stoichiometric proportions of reactants can be used; however preferably about 0.5 to 20 percent excess of hydride over the stoichiometric quantity is used. The excess hydride reduces the tendency for side reactions to occur and accelerates the rate of reaction through the mass action effect. Of course, the formation of the difunctional aluminum compound can also be carried out essentially in one step, although the mono-substituted compound undoubtedly is formed as an intermediate in the process. Thus any of the specific reaction systems hereinbefore set forth (for preparation of the mono-substituted compound) will provide the corresponding difunctional aluminum compound if two or more moles of metal hydride per mole of diolefin are present in the reaction system.

Having thus described my invention, reference will now be made to specific examples to provide a fuller understanding thereof.

In the following examples, the products were hydrolyed or alcoholyzed; and from an analysis of the resultant products, it could be determined whether or not a mono- or disubstituted aluminum compound was obtained and also the extent to which cyclization occurred which indicated the loss or absence of dialuminum compound. Cylization was measured by the presence of methyl cyclopentane in the hydrolyzed or alcoholyzed product.

EXAMPLE 1

30 ml. of anisole, 15 ml. (0.08 mole) of decene-1 and 3.54 gm. (0.025 mole) of diisobutylaluminum hydride were heated together to a temperature of 151–152° C. and maintained at that level for twenty hours. The product was hydrolyzed, and the product of hydrolysis was analyzed by gas chromatography. The analysis showed that 88 percent of decene-1 had reacted with the aluminum compound. No dimer of decene-1 was detected.

EXAMPLE 2

10 ml. of diphenyl ether, 8 ml. of diisobutylaluminum hydride, 5 ml. diethyl ether and 2.5 ml. of hexadiene-1,5 were heated to 80° C. and maintained at that level for two hours. The product was alcoholyzed with ethanol and analyzed. The following analysis was obtained:

| | Percent |
|---|---|
| Hexane | 82 |
| Hexene-1 | 11 |
| Hexadiene-1,5 | 3.5 |
| Methyl cyclopentane | 2.7 |

EXAMPLE 3

The procedure of Example 2 was repeated without the ether, and only methyl-cyclopentane was obtained upon hydrolysis of the product.

EXAMPLE 4

10 ml. of diisobutylaluminum hydride in cyclohexane (0.0052 mole of hydride), 3.6 ml. of di-n-octyl ether and 0.33 ml. of 1,5-hexadiene were heated to 62.3° C. and kept there for two hours. Analysis of the hydrolyzed product showed the following:

| | Percent |
|---|---|
| Hexane | 84.8 |
| Hexene-1 | 10.8 |
| 1,5-hexadiene | 4.4 |
| Methyl-cyclopentane | 0.0 |

EXAMPLE 5

10 ml. of 20 volume percent diisobutylaluminum hydride in dodecane and 0.5 ml. of pentadiene-1,4 were heated to 60° C. and kept at that temperature for two hours. The product was hydrolyzed and analyzed as follows:

| | Percent |
|---|---|
| Pentane | 62.0 |
| Pentene-1 | 22.8 |
| Pentadiene-1,4 | 15.5 |
| Methyl-cyclopentane | -- |

EXAMPLE 6

The same procedure as Example 5 was employed except that heptadiene-1,6 was used in place of pentadiene-1,4 and reaction period was two hours and twenty minutes. The following analysis of the hydrolyzed product was obtained:

| | Percent |
|---|---|
| Heptane | 64.4 |
| Heptene-1 | 25.8 |
| Heptadiene-1,6 | 3.6 |
| Methyl-cyclopentane | 4.5 |

Having thus described the invention by providing specific examples thereof, it is to be understood that no undue limitations or restrictions are to be drawn by reason thereof and that many variations and modifications are within the scope of the invention.

I claim:

1. A compound having the structural formula:

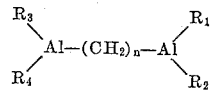

wherein $n$ is an integer of at least five, and $R_1$, $R_2$, $R_3$ and $R_4$ are radicals selected from the group consisting of alkyl and cycloalkyl groups.

2. The compound of claim 1 wherein $n$ is 5 to about 20.

3. The compound of claim 1 wherein $n$ is 5 to about 12.

4. The compound of claim 1 wherein $R_1$, $R_2$, $R_3$ and $R_4$ are isobutyl and $n$ is 5.

5. The compound of claim 1 wherein $R_1$, $R_2$, $R_3$ and $R_4$ are isobutyl and $n$ is 6.

6. The compound of claim 1 wherein $R_1$, $R_2$, $R_3$ and $R_4$ are isobutyl and $n$ is 7.

7. A method of producing a difunctional aluminum compound which comprises reacting a hydride selected from the group consisting of dicycloalkylaluminum hydride and dialkylaluminum hydride with at least a stoichiometric amount of an alpha-omega-diolefin selected from the group consisting of a $C_5$ diolefin and a diolefin containing at least seven carbon atoms to form a mono-substituted aluminum compound and then reacting the mono-substituted aluminum compound with at least a stoichiometric amount of the aforesaid hydride to produce a difunctional aluminum compound.

8. A method of producing a difunctional aluminum compound which comprises reacting a hydride selected from the group consisting of dialkylaluminum hydride and dicycloalkylaluminum hydride with at least a stoichiometric amount of an alpha-omega diolefin containing at least five carbon atoms in the presence of an ether having a heat of complexing between about two and twenty kilocalories per gram mole to form a mono-substituted aluminum compound and reacting the mono-substituted aluminum compound with at least a stoichiometric amount of the aforesaid hydride in the presence of the aforesaid ether to produce a difunctional aluminum compound.

References Cited

UNITED STATES PATENTS

| 2,826,598 | 3/1958 | Ziegler | 260—448 |
| 3,153,661 | 10/1964 | D'Alelio | 260—448 |

FOREIGN PATENTS

| 581,625 | 8/1959 | Canada. |
| 1,198,438 | 6/1959 | France. |

OTHER REFERENCES

Zeiss Organometallic Chemistry, Reinhold Publishing Corp., New York, N.Y., 1960, pages 234 and 235.

TOBIAS E. LEVOW, *Primary Examiner.*

ABRAHAM H. WINKELSTEIN, A. LOUIS MONACELL, *Examiners.*

I. R. PELLMAN, H. M. S. SNEED, *Assistant Examiners.*